(12) United States Patent
Hayasaka et al.

(10) Patent No.: US 10,656,867 B2
(45) Date of Patent: May 19, 2020

(54) COMPUTER SYSTEM, DATA MANAGEMENT METHOD, AND DATA MANAGEMENT PROGRAM

(71) Applicant: Hitachi, Ltd., Tokyo (JP)

(72) Inventors: Mitsuo Hayasaka, Tokyo (JP); Abhishek Johri, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/904,473

(22) Filed: Feb. 26, 2018

(65) Prior Publication Data

US 2019/0073128 A1 Mar. 7, 2019

(30) Foreign Application Priority Data

Sep. 1, 2017 (JP) .................................. 2017-168899

(51) Int. Cl.
*G06F 3/06* (2006.01)
*G06F 11/20* (2006.01)
*H04L 29/08* (2006.01)

(52) U.S. Cl.
CPC ............. *G06F 3/065* (2013.01); *G06F 3/067* (2013.01); *G06F 3/0614* (2013.01); *G06F 11/2069* (2013.01); *G06F 11/2082* (2013.01); *H04L 67/1095* (2013.01); *H04L 67/1097* (2013.01); *G06F 2201/855* (2013.01)

(58) Field of Classification Search
CPC ..... G06F 3/065; G06F 3/0614; G06F 11/2069
See application file for complete search history.

(56) References Cited

U.S. PATENT DOCUMENTS

| 6,907,543 | B2 | 6/2005 | Hino et al. | |
|---|---|---|---|---|
| 8,271,447 | B1 | 9/2012 | Natanzon et al. | |
| 8,806,161 | B1 | 8/2014 | Natanzon | |
| 10,241,712 | B1* | 3/2019 | Elliott, IV | G06F 3/067 |
| 2003/0084242 | A1* | 5/2003 | Strange | G06F 11/2082 711/114 |
| 2005/0015657 | A1* | 1/2005 | Sugiura | G06F 11/1482 714/6.12 |
| 2015/0169411 | A1* | 6/2015 | Kalman | G06F 11/2023 714/4.12 |
| 2016/0328303 | A1* | 11/2016 | Brandner | G06F 11/1662 |
| 2018/0239677 | A1* | 8/2018 | Chen | G06F 11/203 |

FOREIGN PATENT DOCUMENTS

WO WO-2016024994 A1 * 2/2016 .......... G06F 11/2058

* cited by examiner

*Primary Examiner* — Edward J Dudek, Jr.
(74) *Attorney, Agent, or Firm* — Mattingly & Malur, PC

(57) ABSTRACT

In a computer system 10 that includes multiple nodes 100 capable of storing data, and a management computer 410 that manages the nodes 100, a first volume of a first node and a second volume of a second node 100 constitute an HA (High Availability) pair for managing identical data in a duplicated manner. the CPU 120 of the second node is configured to, When the first node becomes offline, write data that is to be written into the second volume of the second node thereafter is written into the second volume and into a third volume of a third node that is different from the first node and the second node.

11 Claims, 13 Drawing Sheets

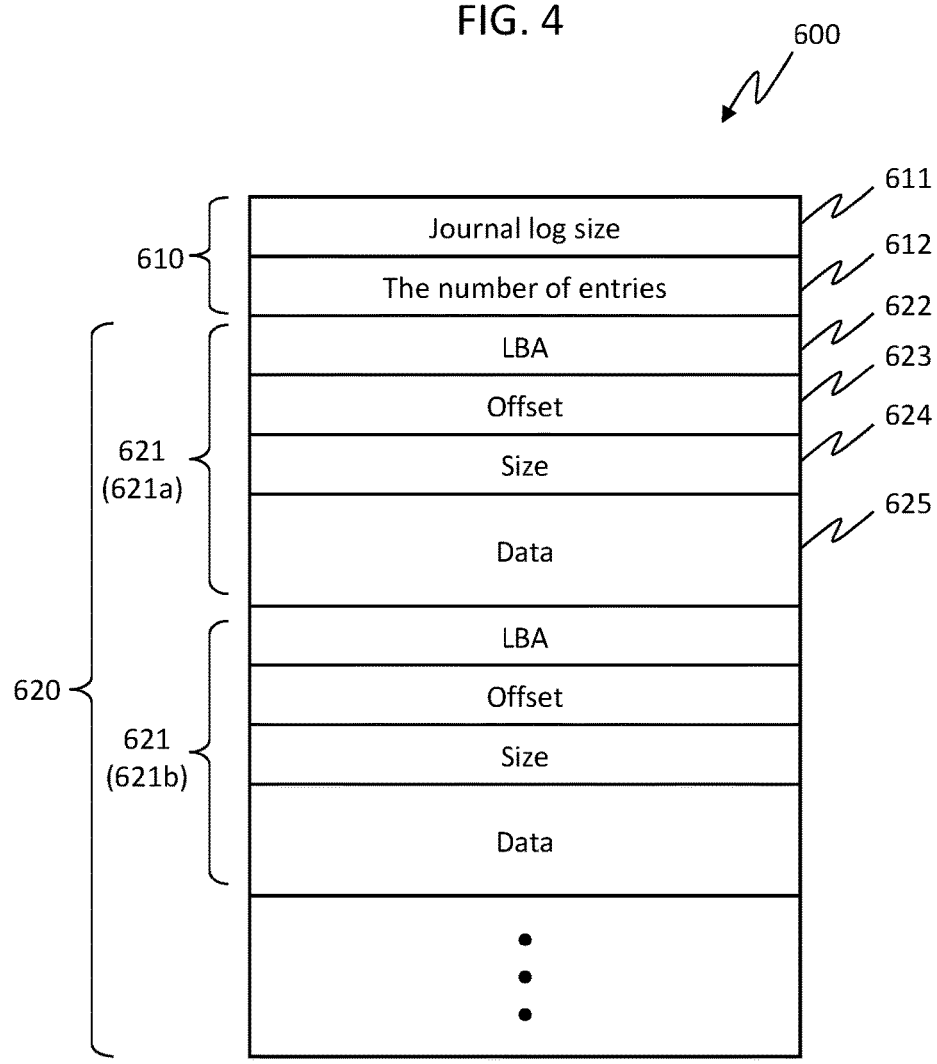

COMPUTER SYSTEM, DATA MANAGEMENT METHOD, AND DATA MANAGEMENT PROGRAM

CROSS-REFERENCE TO PRIOR APPLICATION

This application relates to and claims the benefit of priority from Japanese Patent Application No. 2017-168899 filed on Sep. 1, 2017, the entire disclosure of which is incorporated herein by reference.

BACKGROUND

The present invention relates to a computer system and the like for managing data.

An SDS (Software Defined Storage) has been known that causes multiple computers (nodes) to cooperate with each other using software providing a storage function to thereby constitute a storage system.

As techniques pertaining to the SDS, methods have been known that copy data between different nodes to achieve redundancy of the data between nodes in a data writing process, thus protecting the data (see, for example, U.S. Pat. Nos. 8,806,161, 8,271,447 and 6,907,543).

SUMMARY

For the process of writing data from a client in the SDS, the data is protected by making the data redundant. To achieve data redundancy, data is transferred between nodes, and the data is made permanent in each node, and a response is issued to the client.

For example, in cases of maintenance, such as updates of software and hardware, and new installation, one of the nodes is required to be temporarily shut down.

When the one node is shut down and writing newly occurs to another node, the data is written only to the other node. In case a failure is occurred in the other node in such a state, the data written only in the other node is lost, that is, what is called data loss occurs.

To avoid reduction in data redundancy due to the maintenance or the like, data in a maintenance target node is completely copied to the other node before the maintenance is performed, thus making the data redundant using the copy destination node.

However, if the data in the maintenance target node is copied to the other node, much time and many resources are consumed until the copying is completed. As a result, the I/O performance (host IO performance) in the host computer is reduced. In particular, in a case where many nodes constitute a cluster, the maintenance is required for every node. If the maintenance is performed on a node-by-node basis while the cluster is in operation, a process of copying data in the maintenance target node to the other node is required to be sequentially executed, which consumes significantly much time (e.g., time in units of several weeks) and significantly many resources.

An object of the present invention, which has been made in view of the above situations, is to provide a technique that can relatively easily hold data redundancy.

To achieve the object described above, a computer system according to one aspect includes a plurality of nodes capable of storing data, and a management computer that manages the nodes, wherein a first volume of a first node and a second volume of a second node constitute an HA (High Availability) pair for managing identical data in a duplicated manner, and when the first node becomes offline, a processor unit of the second node writes write data that is to be written into the second volume of the second node thereafter, into the second volume and into a third volume of a third node that is different from the first node and the second node.

The present invention can relatively easily hold data redundancy.

BRIEF DESCRIPTION OF THE DRAWINGS

FIG. 3 is a configuration diagram of an example of a pair management table according to the first embodiment;

FIG. 4 is a configuration diagram of an example of a journal log according to the first embodiment;

DETAILED DESCRIPTION OF THE EMBODIMENT

Figure 1:
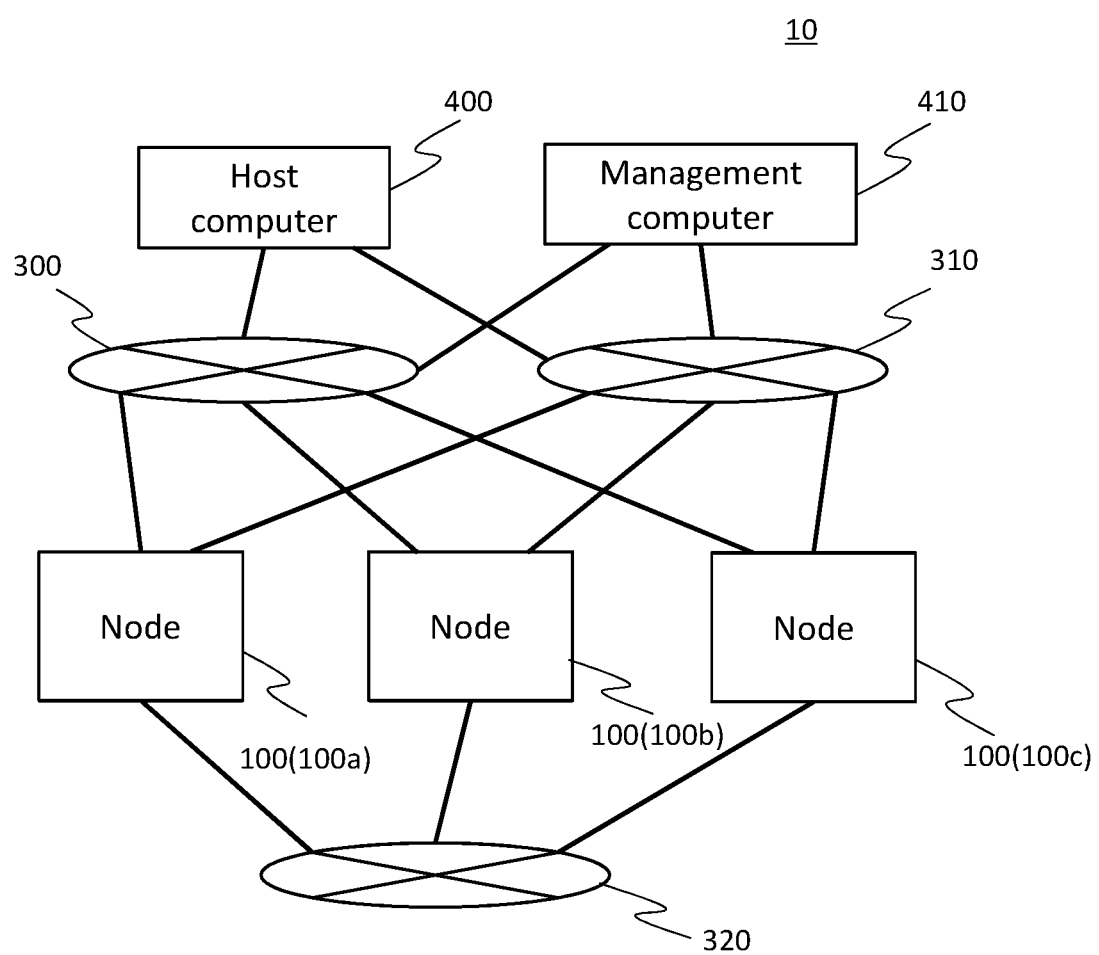
FIG. 1 is an overall configuration diagram of a computer system according to a first embodiment.

Several embodiments are described with reference to the drawings. The embodiments described below do not limit the invention according to the claims. Not all the elements and their combinations described in the embodiments are necessary for the solution of the invention.

In the following description, information is sometimes described with a representation of "AAA table". Alternatively, information may be represented with any data structure. That is, to indicate that information does not depend on the data structure, "AAA table" can be called "AAA information".

In the following description, a "processor unit" includes one or more processors. At least one of the processors is typically microprocessor, such as CPU (Central Processing Unit). Each of the one or more processors may be a single-core or multi-core processor. The processor may include a hardware circuit that performs a part of or the entire process.

In the following description, the process is sometimes described, with a "program" being regarded as a subject of operation. The program is executed by a processor (e.g., a CPU) to perform a determined process appropriately using a storing resource (e.g., a memory) and/or a communication interface device (e.g., a port). Accordingly, the subject of the process may be a program. The process described with the program being regarded as the subject of operation may be a process performed by a processor or a computer (e.g., a management computer, a host computer, etc.) including the processor.

A part of or the entire process performed by the processor may be executed by a hardware circuit. The program executed by the processor may be installed from a program source. The program source may be a program distribution server or a storage medium (e.g., a portable storage medium).

In the following description, "RAID" is an abbreviation of Redundant Array of Independent (or Inexpensive) Disks. A RAID group is constituted by multiple physical devices (typically, physical devices of the same type), and store data according to a RAID level associated with the RAID group. The RAID group may be called a parity group. The parity group may be a RAID group that stores parities, for example.

In the following description, an ID is used as identification information on an element. Instead of or in addition to the ID, another type of identification information may be used. In the following description, in a case where elements of the same type are described without discrimination from each other, a reference symbol or a numeral common to reference symbols is used. In a case where the embodiments of the same type are described with discrimination from each other, the reference symbol of the element is used or the ID assigned to the element instead of the reference symbol is sometimes described. In the following description, an IO (Input/Output) request is a write request or a read request, and may be called an access request.

Embodiment 1

First, a first embodiment is described.

FIG. 1 is an overall configuration diagram of a computer system according to the first embodiment.

A computer system 10 includes one or more host computers (hereinafter called hosts) 400, a management computer 410, and multiple nodes (computers) 100 (100a, 100b, 100c, etc.). A group of nodes included in the computer system 10 is called a storage cluster.

The nodes 100 are coupled to each other via an SAN (Storage Area Network) 300, a LAN (Local Area Network) 310, a back-end SAN 320 and the like. The host 400, the management computer 410, and the node 100 are coupled to each other via the SAN 300 and the LAN 310. According to such a configuration, control information, data and the like are transmitted between the nodes 100, between the nodes 100 and the host 400 and between the nodes 100 and the management computer 410.

Next, the node 100 is described in detail.

Figure 2:
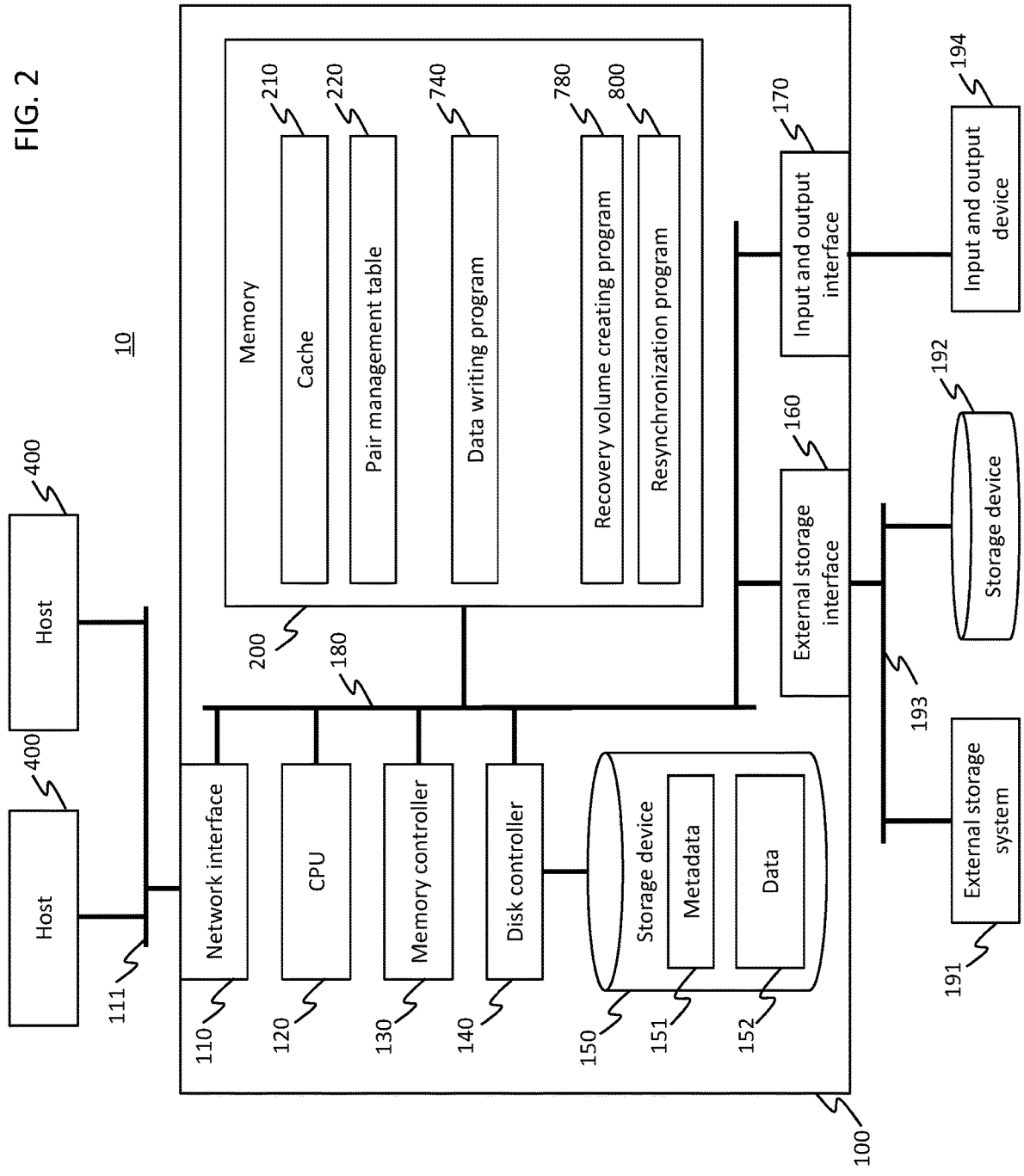
FIG. 2 is a configuration diagram of a part including a node in the computer system according to the first embodiment.

FIG. 2 is a configuration diagram of a part including the node in the computer system according to the first embodiment.

The node 100 includes a network interface 110, a CPU 120 that is an example of the processor unit, a memory controller 130, a disk controller 140, a storage device 150, an external storage interface 160, an input and output interface 170, an internal network bus 180, and a memory 200. The node 100 may include one or more configuration elements, with respect to each of the configuration elements 110, 120, 130, 140, 150, 160, 170, 180 and 200. In the following description, for facilitating the description, the example where one configuration element with respect to each of the elements is included is described.

The network interface 110 is an interface for communicably coupling the node 100 to other computers, such as the host 400 and the management computer 410, via a network 111. The node 100 exchanges data and control information with another computer using the network interface 110. The network 111 may be, for example, the SAN 300, the LAN 310 or the Internet, or may be a dedicated line or a public line.

The CPU 120 is a processor that includes one or more cores. The CPU 120 may be a GPU (Graphics Processing Unit) or an ASIC (Application Specific Integrated Circuit) in order to process a predetermined task at high speed and efficiently. The CPU 120 executes various processes by executing various programs stored in the memory 200.

The memory controller 130 reads data from the memory 200 or writes data into the memory 200 according to an instruction from the CPU 120.

The disk controller 140 reads data from the storage device 150 or writes data into the storage device 150 according to an instruction from the CPU 120.

The storage device 150 is a device for storing data, such as an HDD (Hard Disk Drive) or an SSD (Solid State Drive). The storage device 150 stores user data, an OS, an application program, application data, metadata for disk management, data required to operate the node 100 and the like. For example, the storage device 150 may be a logical device configured using multiple physical disks, or data-protected by the RAID. In the storage device 150, volumes referable from the host 400 are stored, for example.

The external storage interface 160 transfers data to and from one or more external storages, such as an external storage system 191 and a storage device 192, which are coupled to the node 100. The storage device 192 may have a configuration analogous to that of the storage device 150. The storage device 192 may store a volume managed by the coupled node 100. The volume stored in the storage device 192 can also be called a volume stored in the node 100.

The input and output interface 170 communicates with an input and output device 194 coupled to the node 100.

The internal network bus 180 communicably couples the elements (110, 120, 130, 140, 160, 170 and 200) in the node 100 to each other.

The memory 200 includes, for example, one or more DRAMs (Dynamic Random Access Memories) or the like. The memory 200 stores various types of information. The memory 200 may include a cache memory 210 that temporarily stores data in process by the CPU 120, and data to be possibly used in the future. The cache memory 210 may temporarily store metadata for data block management, or store information required for processes of the OS and the application program, and control information required for communication between the CPUs.

In this embodiment, the memory 200 stores a pair management table 220 that is control information for managing pair information on the node. The memory 200 stores a program to be executed by the CPU 120. In this embodiment, the memory 200 stores a data writing program 740, a recovery volume creating program 780, a resynchronization program 800, and other required programs.

The node 100 is a computer or a system used for a general or dedicated purpose, and can serve as, for example, a block data storage system, a file data storage system, an object data storage system, and a unified storage system.

Next, the pair management table 220 is described in detail.

FIG. 3 is a configuration diagram of an example of the pair management table according to the first embodiment.

The pair management table 220 stores configuration information pertaining to pairs of volumes managed by the node 100, and the states of the pairs. The pair management table 220 stores entries corresponding to the respective volumes. The entries of the pair management table 220 each includes fields of a volume ID 221, a HA (High Availability) pair state 222, HA pair volume information 223, a recovery pair state 224, and recovery pair volume information 225.

Identification information (volume ID) on the volume corresponding to the entry is stored in the volume ID 221. The state of the HA pair (HA pair state) on the volume corresponding to the entry is stored in the HA pair state 222. Here, the HA pair is a pair of volumes that is a target for securing the relationship where if the node of one volume is stopped, the node of the other volume can continuously provide data. The HA pair state includes "Pair" (pair) indicating a state capable of continuously providing data between volumes constituting the HA pair (i.e., a state of data synchronization), "Temporarily offline" indicating a state where one of the HA pair is temporarily offline, and the like. The identification information (ID) on the volume (HA pair volume) that constitutes the HA pair with the volume corresponding to the entry is stored in the HA pair volume information 223.

The state of the recovery pair (recovery pair state) that includes the volume corresponding to the entry, and the recovery volume used to recover a volume that constitutes the HA pair with this corresponding volume is stored in the recovery pair state 224. Here, the recovery pair is a pair of the volume corresponding to the entry and the recovery volume. The recovery pair state includes "Pair" indicating the state of data synchronization between the volumes that constitute the recovery pair and the like. The identification information (ID) on the recovery volume that constitutes the recovery pair with the volume corresponding to the entry is stored in the recovery pair volume information 225.

Next, a journal log 600 to be stored in the recovery volume, which is for recovering the volume, is described in detail.

FIG. 4 is a configuration diagram of an example of the journal log according to the first embodiment.

The journal log 600 includes a fixed-length header 610, and a variable-length body 620. The header 610 includes fields of a journal log size 611, and the number of entries 612. The entire size of the journal log 600 is stored in the journal log size 611. The total number of entries 621, described later, contained in the body 620 is stored in the number of entries 612.

The body 620 includes one or more entries 621 (621a, 621b . . . ). The entry 621 includes fields of an LBA 622, an offset 623, a size 624, and data 625. A logical block address (LBA) in the volume where update data (write data) is stored, is stored in the LBA 622. Information that indicates an update position in LBA (for example, the number of bytes from the beginning) is stored in the offset 623. The size of the update data is stored in the size 624. The update data is stored in the data 625. The data 625 is a variable-length field.

Next, the management computer 410 is described in detail.

Figure 5:
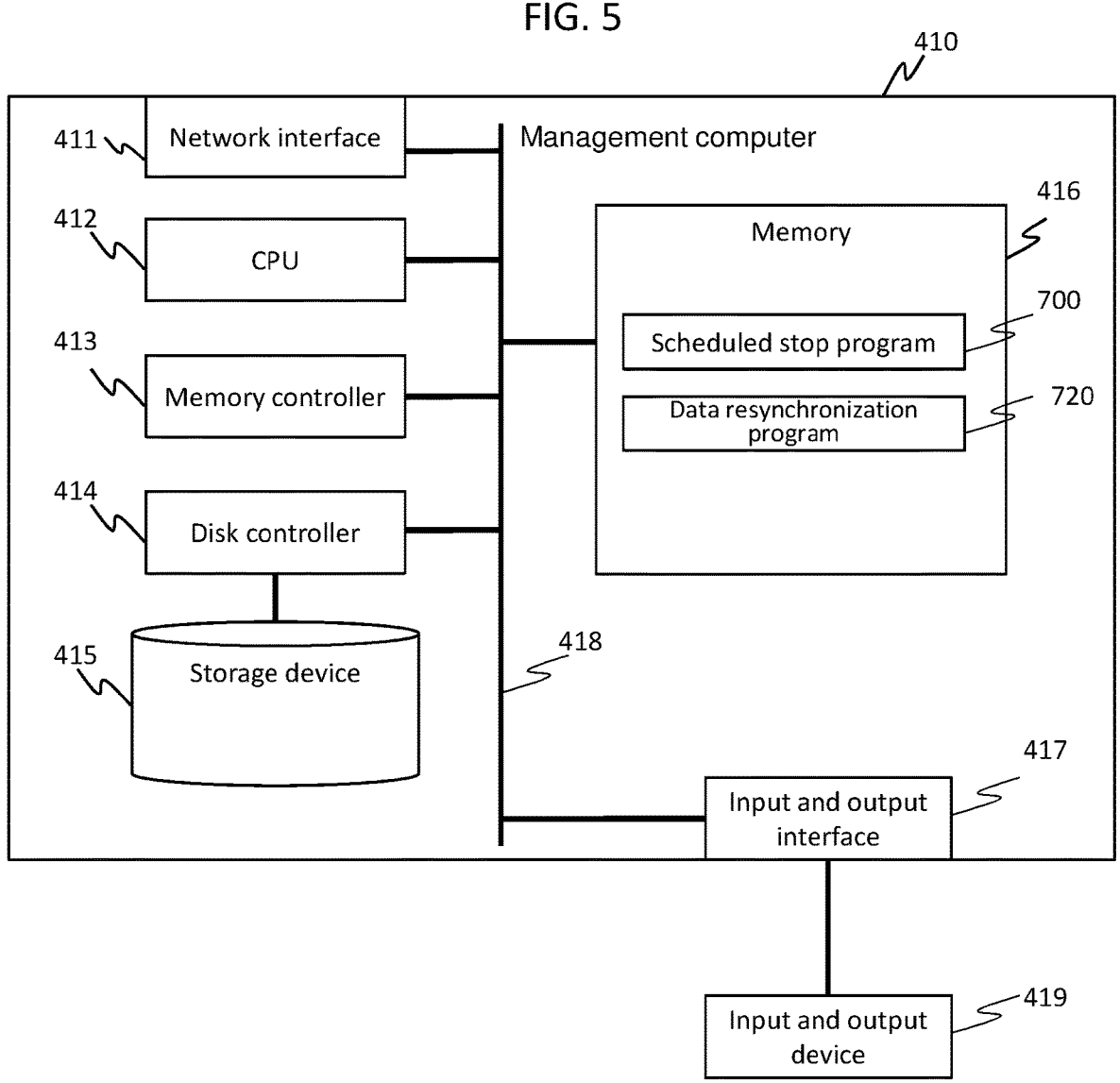
FIG. 5 is a configuration diagram of a management computer according to the first embodiment.

FIG. 5 is a configuration diagram of the management computer according to the first embodiment.

The management computer 410 includes a network interface 411, a CPU 412 that is an example of the processor unit, a memory controller 413, a disk controller 414, a storage device 415, a memory 416, an input and output interface 417, and an internal network bus 418.

The network interface 411 is an interface for communicably coupling the management computer 410 to other computers, such as the host 400 and the node 100.

The CPU 412 is a processor that includes one or more cores. The CPU 412 executes various processes by executing various programs stored in the memory 416.

The memory controller 413 reads data from the memory 416 or writes data into the memory 416 according to an instruction from the CPU 412.

The disk controller 414 reads data from the storage device 415 or writes data to the storage device 415 according to an instruction from the CPU 412.

The storage device 415 is a device, such as an HDD or an SSD, which is for storing data. The storage device 415 stores an OS, an application program, application data, other data and the like.

The input and output interface 417 communicates with an input and output device 419 coupled to the management computer 410.

The internal network bus 418 communicably couples the elements (411, 412, 413, 414, 416 and 417) in the management computer 410 to each other.

The memory 416 includes, for example, one or more DRAMs. The memory 416 stores various types of information. The memory 416 stores a scheduled stop program 700, data resynchronization program 720, and other required programs.

Next, the host 400 is described in detail.

Figure 6A:
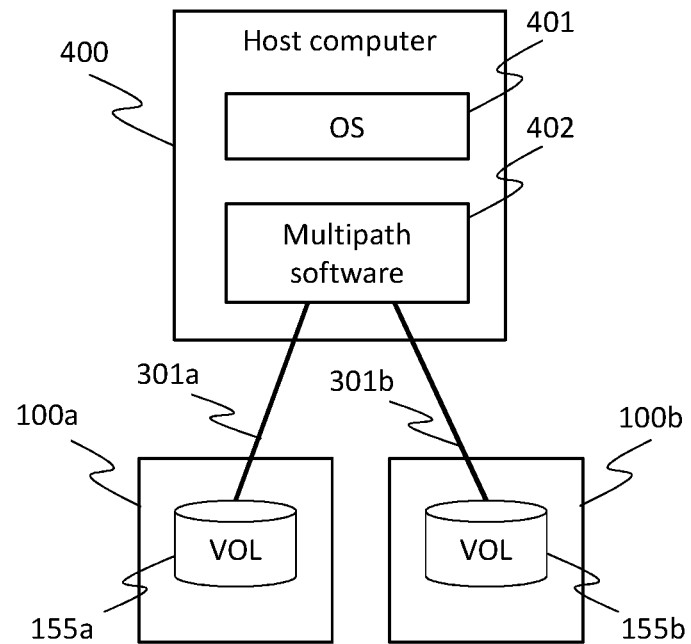
FIGS. 6A and 6B are diagrams illustrating access to volumes of an HA pair by a host computer according to the first embodiment.
Figure 6B:
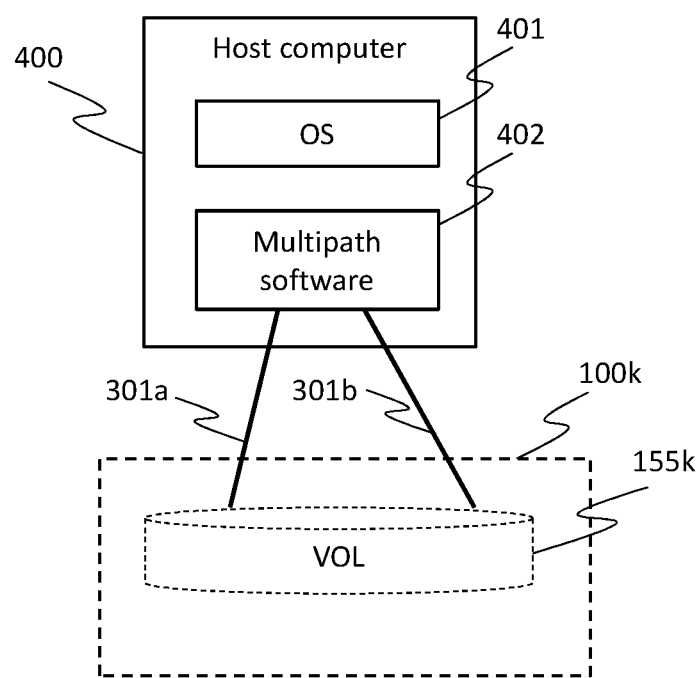

FIGS. 6A and 6B are diagrams illustrating access to volumes of an HA pair by the host computer according to the first embodiment.

The host 400 is a typical computer that includes a CPU, and a memory, and stores an OS (Operating system) 401, such as Microsoft Windows® or Linux®, and multipath software 402 in the memory, and executes the OS 401 and software.

For example, as shown in FIG. 6A, the host 400 is coupled to a volume 155a of the node 100a by a path 301a through the SAN 300, and is coupled to a volume 155b of the node 100b by a path 301b through the SAN 300.

Here, in a case where the volume 155a of the node 100a and the volume 155b of the node 100b are configured as an HA pair, the node 100a and the node 100b return the same volume ID on the volume 155a and the volume 155b to the multipath software 402 of the host 400. In this case, the multipath software 402 determines that the same volume ID can be used for the volumes coupled to the path 301a and the path 301b, and assumes that a virtual node 100k is coupled to two paths that are the path 301a and the path 301b and that a virtual volume 155k resides in the virtual node 100k, as shown in FIG. 6B.

In the case where the HA pair is thus configured, the multipath software 402 uses the path 301a or the path 301b when accessing the virtual volume 155k. In the case where the volume 155a of the node 100a and the volume 155b of the node 100b are configured as the HA pair, there is a possibility that a problem in that the PVOL (Primary Volume) is not integrally determined between the nodes, that is, a so-called split-brain problem occurs. To address this problem, a disk that is called a quorum disk and manages the identification of a certain volume as the PVOL may be provided in the node 100 different from the nodes 100a and 100b, which manage the volumes of the HA pair.

Next, the data management process pertaining to node stop is described.

FIGS. 7A to 7E are diagrams illustrating a data management process pertaining to node stop according to the first embodiment.

Figure 7A:
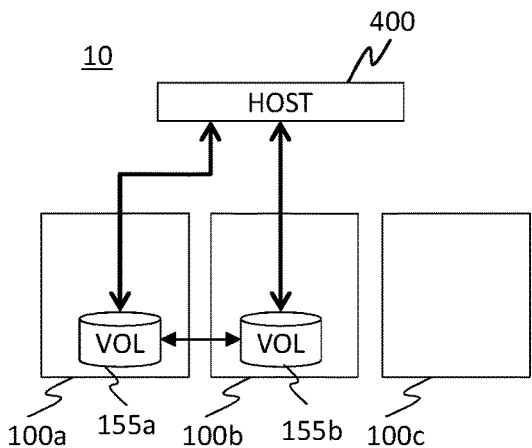
FIGS. 7A to 7E are diagrams illustrating a data management process pertaining to node stop according to the first embodiment.

Here, the computer system 10 is assumed to be in an initial state as shown in FIG. 7A. More specifically, the computer system 10 includes the node 100a, the node 100b and the node 100c. In the node 100a, the volume 155a is managed. In the node 100b, the volume 155b is managed. The volume 155a and the volume 155b are assumed to constitute the HA pair. The node 100c may be used as a node that holds a quorum disk for the HA pair of the volume 155a and the volume 155b.

In the state shown in FIG. 7A, the host 400 can transmit an IO request to the volume 155a or the volume 155b. When a write request to any of the volumes is issued from the host 400, write data that is a target of the write request is synchronized between the volumes 155a and 155b, and resultantly, is made redundant (duplicated) and held between the volumes 155a and 155b. On the other hand, when a read request to any of the volumes is issued from the host 400, the node having received the read request reads the read target data from its own volume and transmits the data to the host 400.

Figure 7B:
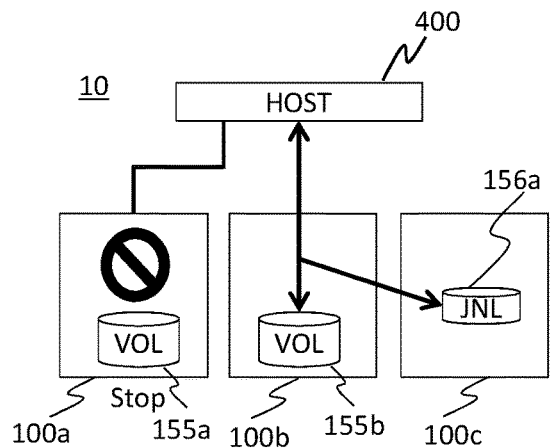

Here, when the node 100a (first node) is subjected to scheduled stop, as shown in FIG. 7B, the scheduled stop program 700 of the management computer 410 creates a recovery volume 156a (here, a journal volume that stores the journal log 600) which is for recovering the volume 155a in a case of restart of the operation of the node 100a, in the node 100c (third node) other than the node 100a and the node 100b (second node), which store the respective volumes 155a and 155b constituting the HA pair, and creates a recovery pair using the volume 155b and a recovery volume 156a. In this case, write data for the write request (host write IO) issued from the host 400 for the volume 155b of the node 100b is duplicated between the volume 155b and the recovery volume 156a.

Figure 7C:
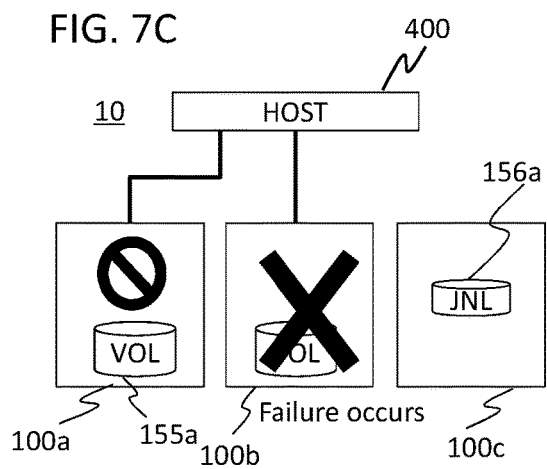

In the state shown in FIG. 7B, in case a failure occurs in the node 100b, the volume 155b of the node 100b cannot be accessed from the host 400, as shown in FIG. 7C.

Figure 7D:
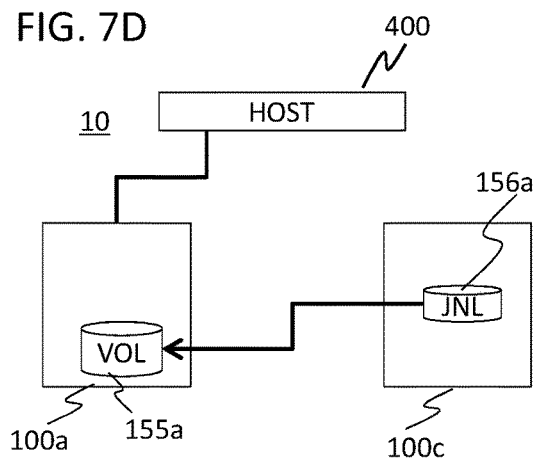

In case of the state shown in FIG. 7C, the stop of the node 100a is released, and subsequently, as shown in FIG. 7D, the data resynchronization program 720 of the management computer 410 causes the volume 155a to recover the state of holding the latest data, using the journal log 600 stored in the recovery volume 156a of the node 100c.

More specifically, the data resynchronization program 720 of the management computer 410 configures the volume 155a of the node 100a and the recovery volume 156a as a resynchronized pair, in a state where the IO from the host 400 is temporarily stopped. Accordingly, the resynchronization program 800 of the node 100c reads all the journal logs 600 stored in the recovery volume 156a, writes data in each entry 621 of each journal log 600 into a logical block indicated by the LBA 622 of the entry 621 in the volume 155a, with the address indicated by the offset 623 being adopted as the offset. Consequently, the volume 155a in the node 100a is in the state of holding the latest data.

Figure 7E:
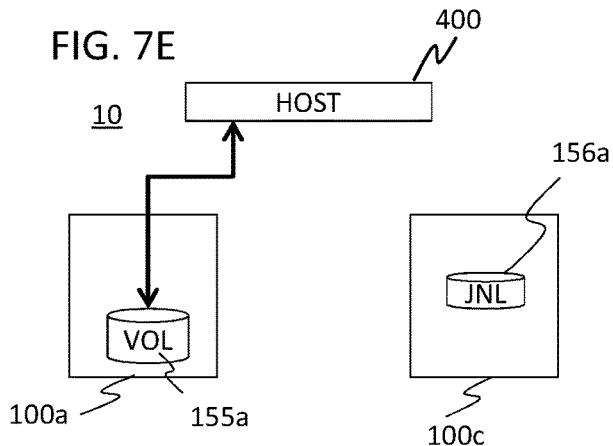

Subsequently, the data resynchronization program 720 of the management computer 410 restarts IO from the host 400 for the volume 155a of the node 100a, and then, as shown in FIG. 7E, the host 400 can perform the IO for the volume 155a that holds the latest data. After the volume 155a has restored the latest data, all the entries in the journal logs 600 in the recovery volume 156a may be deleted.

Next, a method of creating the recovery volume in a case where the computer system 10 includes three nodes 100 (100a, 100b and 100c) and multiple HA pairs made up of multiple volumes managed by these nodes 100 are configured, is described.

Figure 8A:
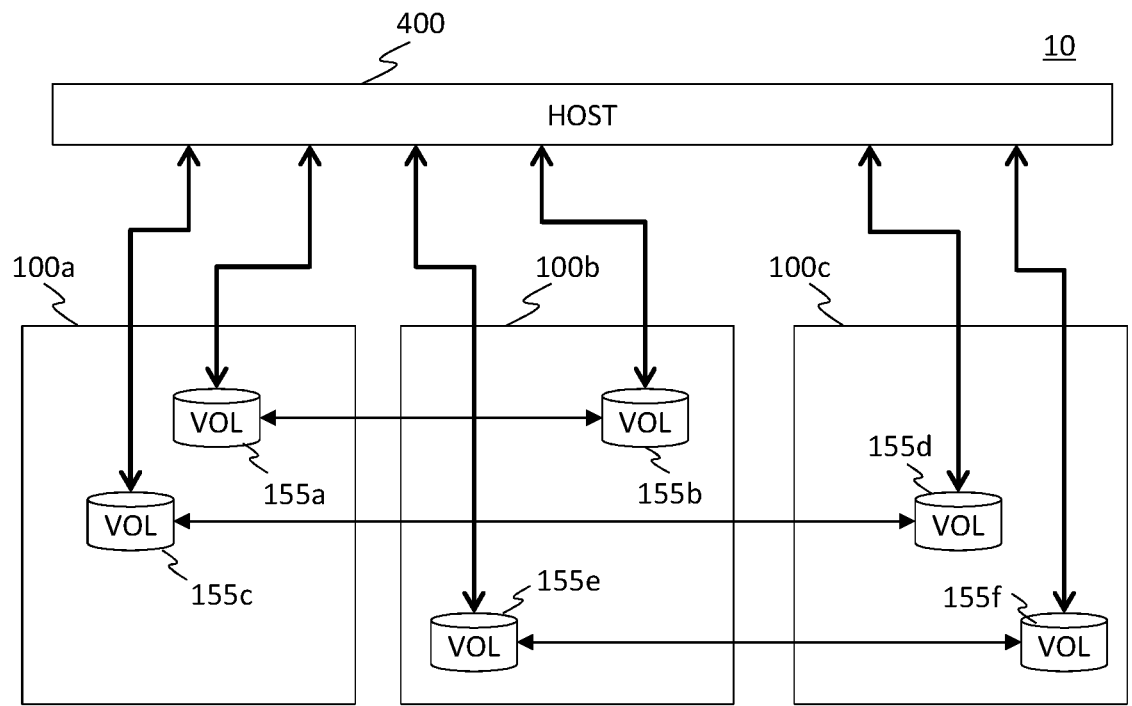
FIGS. 8A and 8B are diagrams illustrating multiple HA pairs and recovery volumes pertaining thereto according to the first embodiment.
Figure 8B:
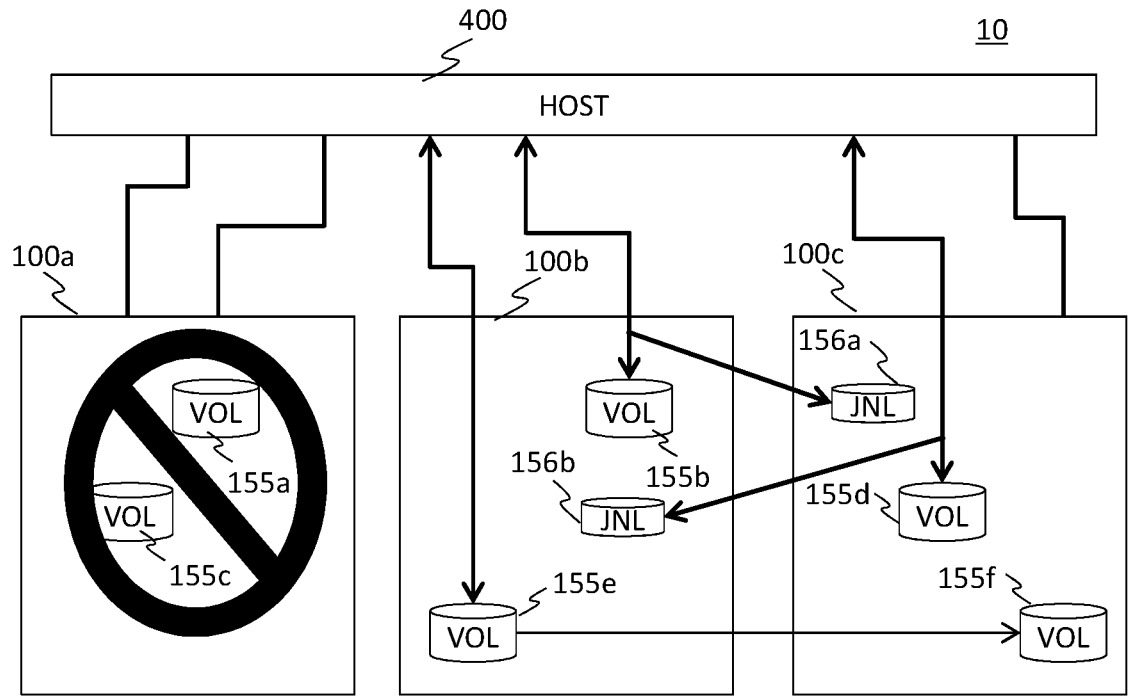

FIGS. 8A and 8B are diagrams illustrating the multiple HA pairs and recovery volumes pertaining thereto according to the first embodiment.

Here, the computer system 10 is assumed to be in an initial state as shown in FIG. 8A. More specifically, it is assumed that the computer system 10 includes the node 100a, the node 100b and the node 100c, and volumes 155a and 155c are held in the node 100a, volumes 155b and 155e are held in the node 100b, and volumes 155d and 155f are held in the node 100c. It is further assumed that the volume 155a of the node 100a and the volume 155b of the node 100b constitute an HA pair (first HA pair), the volume 155c of the node 100a and the volume 155d of the node 100c constitute an HA pair (second HA pair), and the volume 155e of the node 100b and the volume 155f of the node 100c constitute an HA pair (third HA pair).

When the node 100a is stopped in the state shown in FIG. 8A, the computer system 10 is assumed to have a configuration as shown in FIG. 8B.

When the node 100a is stopped, the first HA pair and the second HA pair come into a state incapable of using one of the volume of the HA pair. In this case, in the computer system 10, for the first HA pair, a recovery volume 156a is created in the node 100c, and the journal log 600 of the write request for the volume 155b is stored in a recovery volume 156a. For the second HA pair, a recovery volume 156b is created in the node 100b, and the journal log 600 of the write request for the volume 155d is stored in a recovery volume 156b.

Meanwhile, for the third HA pair, both the volumes do not reside in node 100a. Consequently, the volumes can be used as they are. In a case where a quorum disk for the third HA pair is created in the node 100a, stop of the node 100a prevents the quorum disk from being used. In this case, to avoid the split-brain problem, the scheduled stop program 700 of the management computer 410 may stop the IO from the host 400 for any one of the HA pair to cause the number of volumes accepting the IO from the host to be one, and the node that holds the volume concerned synchronously copies the write data for this volume to another volume. In the example shown in FIG. 8B, the management computer 410 stops the IO from the host 400 for the volume 155f, and the node 100b writes the write data from the host 400 for the volume 155e into the volume 155f, thus duplicating the data.

Next, the processing operation in the computer system 10 is described.

Figure 9:
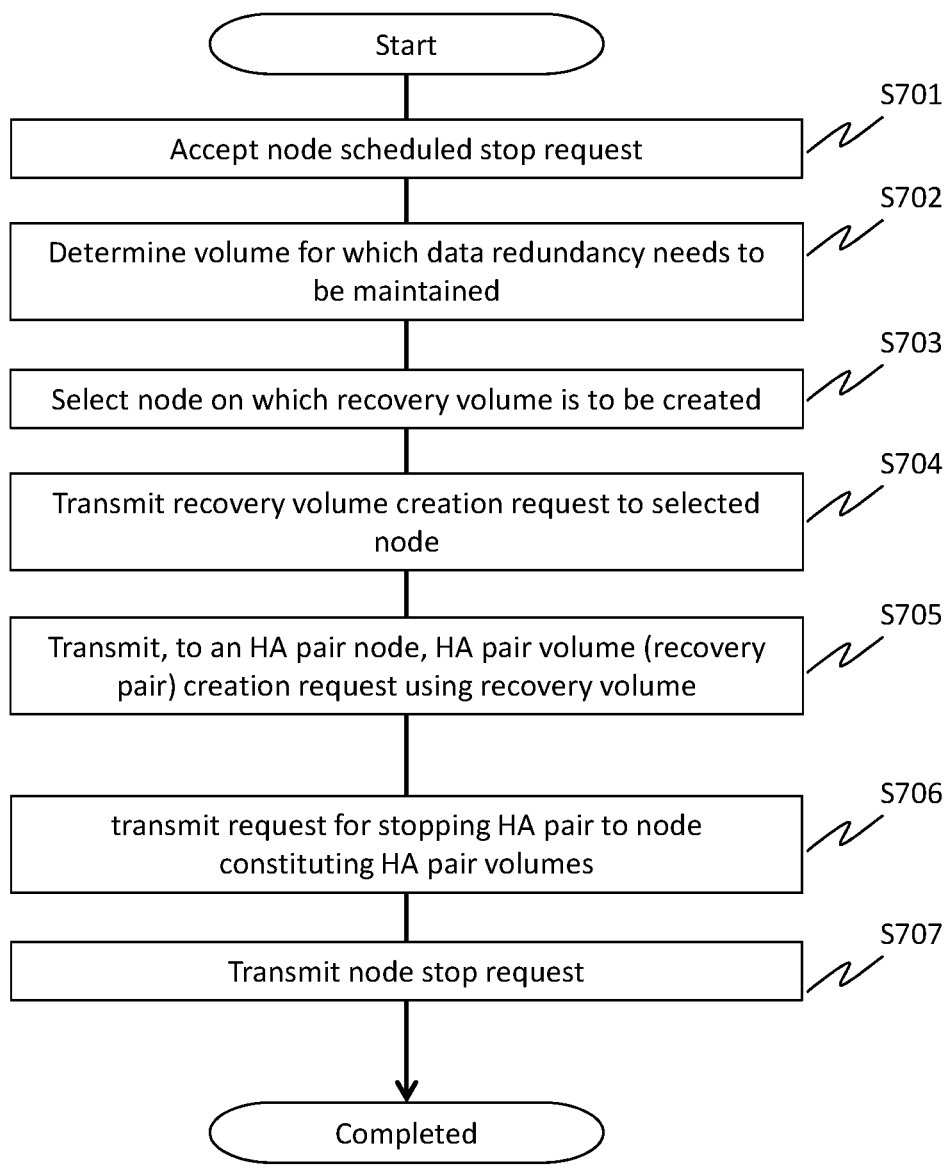
FIG. 9 is a flowchart of a node scheduled stop process according to the first embodiment.

FIG. 9 is a flowchart of a node scheduled stop process according to the first embodiment.

The node scheduled stop process is a process achieved by the CPU 412 executing the scheduled stop program 700 in the memory 416 in the management computer 410.

The scheduled stop program 700 of the management computer 410 accepts a request for a scheduled stop (node scheduled stop request) designating the node (first node) to be subjected to scheduled stop (step S701) from an administrator via the input and output device 419.

Next, the scheduled stop program 700 determines a volume that is held by the node as the target of the scheduled stop and for which data redundancy needs to be maintained (step S702). More specifically, the scheduled stop program 700 transmits a request for volume information on all the volumes that constitute the HA pairs with the volumes held by the node 100 that is the stop target, to this node 100. In response thereto, the node 100 having received the request for the volume information refers to the pair management table 220, identifies the volume ID in the volume ID 221 of the entry whose HA pair state 222 is Pair, and the volume information stored in the HA pair volume information 223, and transmits these volume ID and volume information to the scheduled stop program 700 of the management computer 410. Subsequently, the scheduled stop program 700 determines the volume for which data redundancy needs to be maintained, on the basis of the obtained volume ID and volume information.

Alternatively, the volume whose recovery volume is to be created may be determined by the administrator's designation of the volume ID of the volume with which the HA pair is configured. Alternatively, in the management computer 410, information on the latest pair management table 220 held by the multiple nodes 100 that constitute the storage cluster may be preliminarily obtained, and the scheduled stop program 700 may determine the volume for which data redundancy needs to be maintained, on the basis of the preliminarily obtained information. According to such a configuration, in the node scheduled stop process, a process of querying the scheduled stop target node 100 about the volume information can be omitted.

Next, the scheduled stop program 700 refers to the preliminarily stored information on the nodes 100 that constitute the storage cluster, and selects the node 100 (third node) on which the recovery volume 155 for recovering the volume of the scheduled stop target node 100 (step S703) is to be created.

The scheduled stop program 700 selects the node 100 that satisfies the following two conditions as the node (third node) on which the recovery volume is to be created.

Condition 1: The node should not be a node that is to be soon stopped.

Condition 2: The node should be a node that has a sufficient free capacity that can store journal logs pertaining to the volumes for which data redundancy needs to be maintained while the scheduled stop target node is offline.

The scheduled stop program 700 selects a node 100 on which a recovery volume for each volume required to have data redundancy in the scheduled stop target node 100 is to be created. A node different from the node (second node) holding the volume that constitutes the HA pair with any volume required to have redundancy is selected as the node 100 on which the recovery volume is to be created.

Next, the scheduled stop program 700 transmits, to the selected node 100, a request (recovery volume creation request) of an instruction for creating the recovery volume (step S704). The node 100 having received the recovery volume creation request creates the recovery volume.

Next, the scheduled stop program 700 transmits a request (recovery volume pair request) of an instruction for making a recovery volume pair, to the node 100 holding the volume that constitutes the HA pair with the volume for which data redundancy needs to be maintained, and to the node 100 caused to create the recovery volume; the recovery volume pair is made between these volumes (step S705). Each of the nodes 100 having received the recovery volume pair request stores the volume information corresponding to the recovery volume pair request, in the recovery pair volume information 225 in the entry corresponding to the request of the pair management table 220 held in each node 100.

Next, the scheduled stop program 700 transmits, to the scheduled stop target node 100 and to the node 100 holding the volume constituting the HA pair with the volume of this scheduled stop target node 100, a request for stopping the HA pair of these volumes, and transmits to the scheduled stop target node 100, a request for causing the volume constituting the HA pair to be offline (step S706).

As a result, the scheduled stop target node 100 processes all the IO requests that are in process and are stored in its own queue, causes the target volume to be offline, and configures the HA pair state 222 of the entry corresponding to the volume in the pair management table 220 to be temporarily offline. Meanwhile, the node 100 holding the volume constituting the HA pair with the volume of the scheduled stop target node 100 configures the HA pair state 222 of the entry corresponding to the volume in the pair management table 220 to be temporarily offline.

Next, the scheduled stop program 700 transmits a stop request to the scheduled stop target node 100 (step S707). The node 100 having received the stop request stops its own operation, and sets the state to the offline state.

As described above, according to the aforementioned node scheduled stop process, the recovery volume corresponding to each volume required to have data redundancy can be created, and the journal log to be reflected in each volume required to have data redundancy can be stored in the recovery volume. Each volume required to have data redundancy is not necessarily copied in its entirety to another node. Accordingly, the processing time can be reduced, the required resource can be reduced, and the data redundancy can relatively easily be held.

Next, the volume recovery process for causing the volume of the temporarily stopped node 100 to recover the latest data is described.

Figure 10:
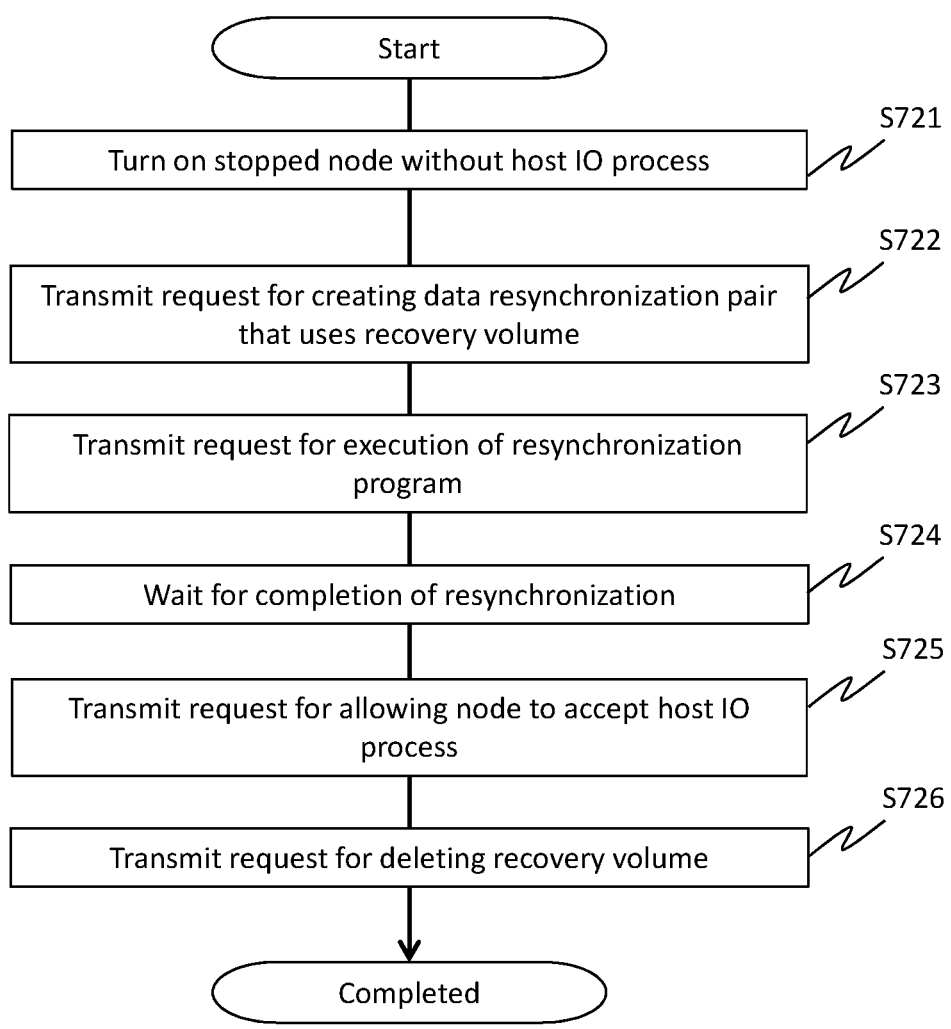
FIG. 10 is a flowchart of a volume recovery process according to the first embodiment.

FIG. 10 is a flowchart of the volume recovery process according to the first embodiment.

The volume recovery process is a process achieved by the CPU 412 executing the data resynchronization program 720 in the memory 416 in the management computer 410. The volume recovery process is executed in case a failure occurs in an active volume while a certain node 100 is in the scheduled stop state, and in a case where the scheduled stop for the node 100 is finished, for example.

The data resynchronization program 720 of the management computer 410 transmits, to the node 100 subjected to the scheduled stop, a request for turning on this node in a state where the volume (recovery target volume) which is required to have data redundancy and is a recovery target accepts no IO request issued by the host 400 (step S721). Upon receipt of this request, the node 100 subjected to scheduled stop comes into an ON state with no IO request being accepted.

Next, the data resynchronization program 720 transmits, to the node 100 in the ON state (restarted node), a request for causing the recovery target volume and the recovery volume corresponding to this recovery target volume to constitute a resynchronized pair (resynchronized pair request). The restarted node having received the resynchronized pair request transmits the resynchronized pair request to the node 100 that holds the recovery volume, and configures resynchronization in the recovery pair state 224 of the entry corresponding to the recovery target volume in the pair management table 220 (step S722).

Next, the data resynchronization program 720 transmits, to the restarted node, a request for starting execution of the resynchronization program 800 (execution start request) (step S723). The restarted node having received the execution start request starts execution of the resynchronization program 800. The resynchronization program 800 updates the recovery target volume with the latest data held in the recovery volume. Accordingly, the recovery target volume can recover the latest state.

Next, the data resynchronization program 720 waits until resynchronization of the recovery target volume (coming into the latest state) is completed (step S724). The program may asynchronously wait a response of completion pertaining to the resynchronization from the restarted node, and may execute a process for another recovery target volume during the waiting.

After the resynchronization of the recovery target volume is completed, the data resynchronization program 720 transmits, to the restarted node, a request for permitting the recovery target volume to accept IO from the host 400 (IO acceptance permission request) (step S725). Upon receipt of the IO acceptance permission request, the restarted node brings the recovery target volume into a state where IO from the host 400 can be accepted. As a result, the host 400 executes path rescanning. According to this execution, the fact that the recovery target volume of the restarted node becomes usable can be found, and an IO request to the recovery target volume is allowed to be issued.

Next, the data resynchronization program 720 transmits a request (recovery volume delete request) for deleting the recovery volume, to the node 100 that holds the recovery volume. As a result, the node 100 that holds the recovery volume can delete the recovery volume, and increase the usable storage capacity. Alternatively, without deleting the recovery volume, this recovery volume may be used as a recovery volume in a case where another node 100 is subjected to scheduled stop.

As described above, the aforementioned volume recovery process can cause the volume of the restarted node to recover the latest data, and allows the volume to be usable from the host 400.

Next, a host write IO process in a case where a write request is issued by the host 400 to the node 100 is described.

Figure 11:
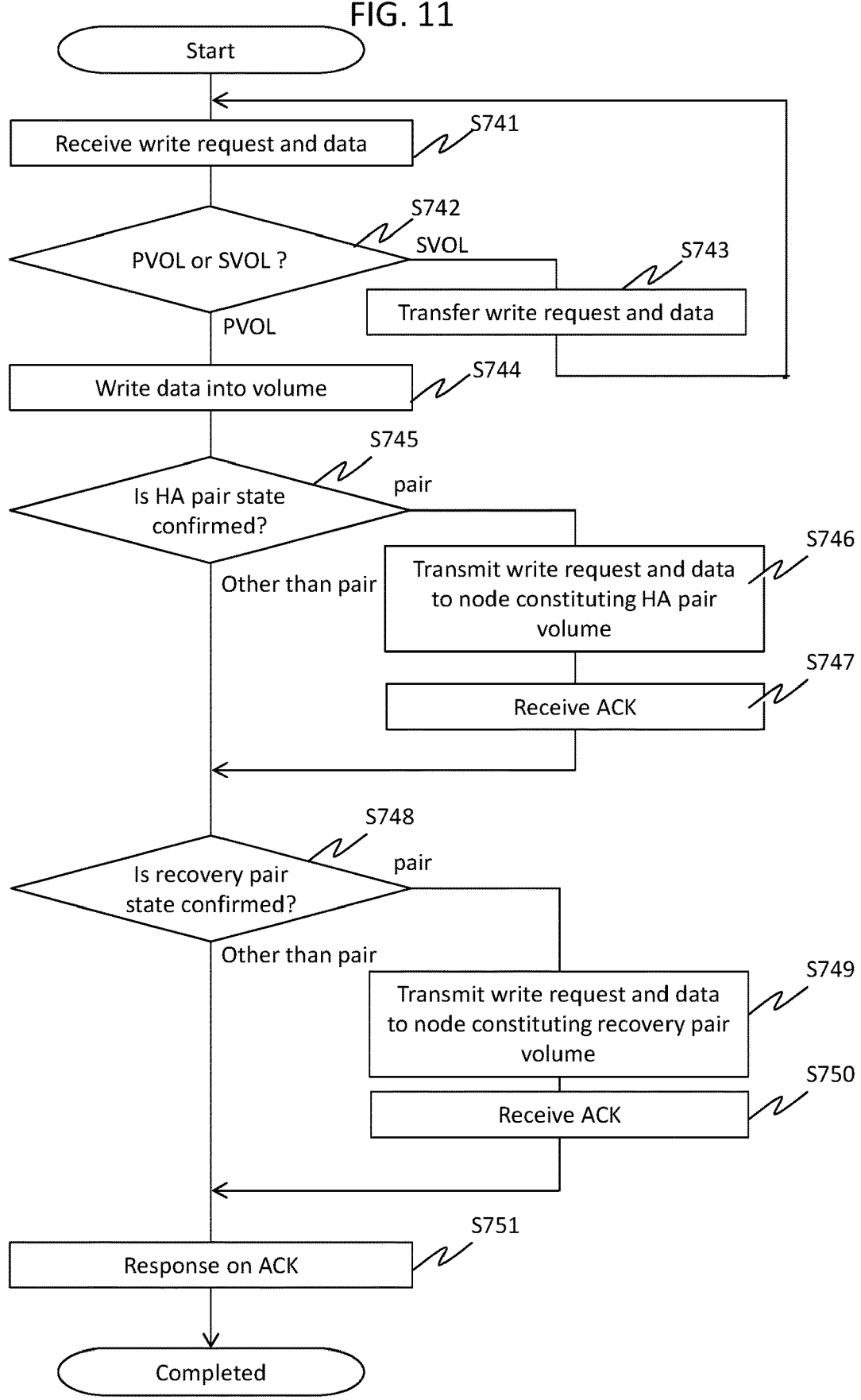
FIG. 11 is a flowchart of a host write IO process according to the first embodiment.

FIG. 11 is a flowchart of the host write IO process according to the first embodiment.

The host write IO process is a process achieved by the CPU 120 executing the data writing program 740 in the memory 200 in the node 100.

Upon receipt of the write request and the write request target data (write data) from the host 400 (step S741), the data writing program 740 determines whether the request destination volume of the write request is PVOL or SVOL (Secondary Volume) (step S742).

As a result, if the request destination volume is SVOL (step S742: SVOL), the data writing program 740 transfers the received write request and write data to the node 100 holding the volume that is the PVOL constituting the HA pair with the write request destination volume (step S743), and advances the processing to step S741.

On the contrary, the request destination volume is the PVOL (step S742: PVOL), the data writing program 740 writes the write data in the request destination volume (step S744).

Next, the data writing program 740 refers to the entry of the pair management table 220 that corresponds to the request destination volume, and confirms the HA pair state configured in the HA pair state 222 of the entry (step S745).

As a result, if the HA pair state is Pair (step S745: Pair), the data writing program 740 identifies the volume (HA pair volume) that constitutes the HA pair on the basis of the HA pair volume information 223 in the entry, transmits the request for writing into the volume and the write data, to the node that holds the volume (step S746), receives an acknowledgment (ACK) to this request (step S747), and subsequently advances the processing to step S748. Accordingly, the same data can be stored in the pair of the volumes that constitute the HA pair. That is, data redundancy can be achieved.

On the contrary, the HA pair state is other than Pair (step S745: Other than pair), the data writing program 740 advances the processing to step S748.

In step S748, the data writing program 740 confirms the recovery pair state stored in the recovery pair state 224 in the entry of the pair management table 220 that corresponds to the request destination volume.

As a result, if the recovery pair state is Pair (step S748: Pair), the data writing program 740 identifies the volume (recovery volume) that constitutes the recovery pair on the basis of the recovery pair volume information 225 in the entry, and transmits the request for writing into the recovery volume and the write data, to the node that holds the recovery volume (step S749). In the node having received this request, the data writing program 740 of the node adds the content corresponding to the write request (the write destination LBA, offset, data size, data, etc.) to the journal log 600, and returns the acknowledgment (ACK) in response to the request. The node 100 having transmitted the request receives the acknowledgment (step S750) and subsequently advances the processing to step S751. Accordingly, the write data can be stored in the recovery volume that constitutes the recovery pair. That is, the redundancy of the write data can be achieved.

On the contrary, the recovery pair state is other than Pair (step S748: Other than pair), the data writing program 740 advances the processing to step S751.

In step S751, the data writing program 740 issues, to the host 400, a response that the write request from the host 400 has been completed.

Next, a process in case of occurrence of a network failure with the node 100 that holds the volume constituting the HA pair is described. In this example, the network failure encompasses not only a state where the network itself with the node 100 fails and communication cannot be performed, but also a state where the node 100 itself fails and communication cannot be performed.

Figure 12:
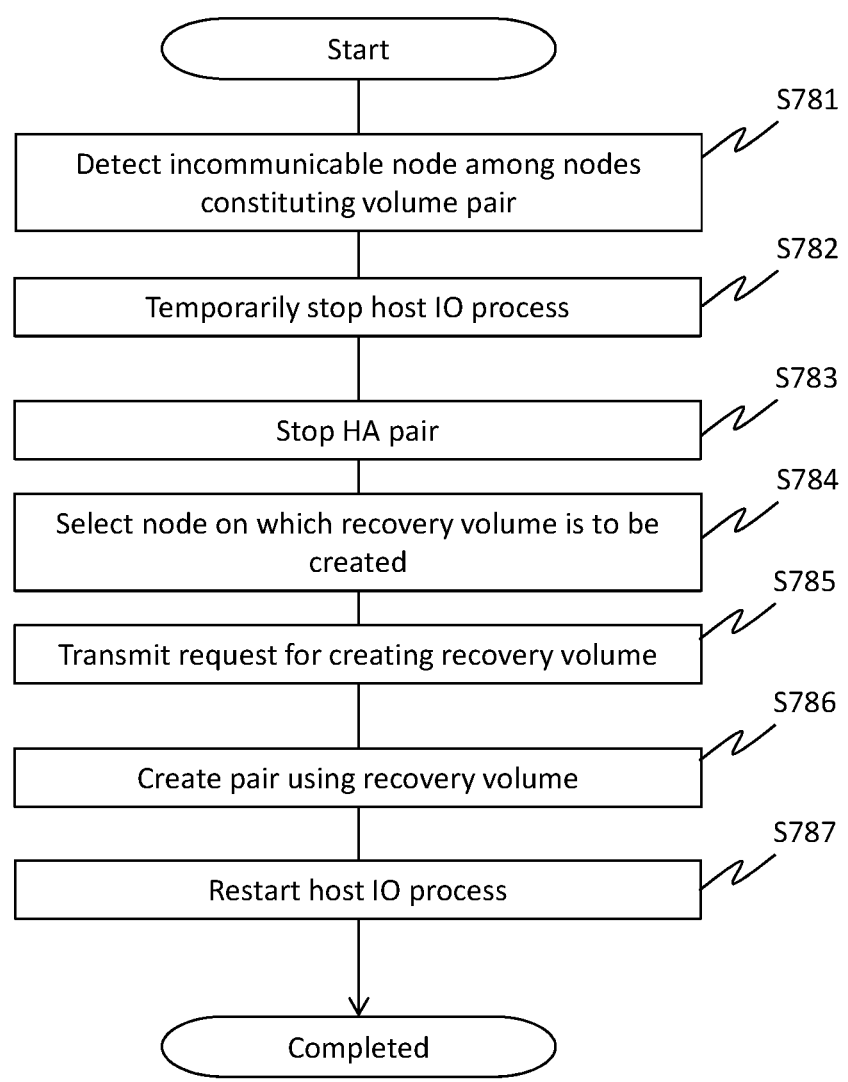
FIG. 12 is a flowchart of a process in case of network failure occurrence according to the first embodiment.

FIG. 12 is a flowchart of the process in case of network failure occurrence according to the first embodiment.

The process in case of network failure occurrence is a process achieved by the CPU 120 executing the recovery volume creating program 780 in the memory 200 in the node 100.

The recovery volume creating program 780 refers to the pair management table 220, detects the incommunicable node 100 among the nodes that hold the volume constituting the HA pair with the volume held in the own node 100 (step S781), and stops the IO process on the basis of the IO request for the own volume issued by the host 400 (step S782).

Next, the recovery volume creating program 780 stops the state of the HA pair, and configures Stop in the HA pair state 222 in the entry of the pair management table 220 that corresponds to the volume (step S783).

Next, the recovery volume creating program 780 selects the node on which the recovery volume for recovering the volume constituting the HA pair of the incommunicable node is to be created (step S784).

In this Embodiment, the node on which the recovery volume is to be created is determined according to any one of the following processes.

Process 1 Communicate with all the online nodes in the computer system 10, and select the node having the largest free capacity.

Process 2 Communicate with all the online nodes in the computer system 10, and select the node that has a sufficient free capacity and the lightest IO workload.

Process 3 Communicate with the management computer 410, and select the node corresponding to the result obtained by execution of Process 1 and Process 2 by the management computer 410.

The selected node 100 is hereinafter called a node for recovery.

Next, the recovery volume creating program 780 transmits a request (recovery volume creation request) for creating the recovery volume, to the node for recovery (step S785). The node for recovery having received the recovery volume creation request creates the recovery volume.

Next, the recovery volume creating program 780 creates the recovery pair using the own volume and the created recovery volume, and stores information on the recovery pair, in the recovery pair volume information 225 in the entry of the pair management table 220 that corresponds to the volume (step S786). The node for recovery stores the information on the recovery pair, in the recovery pair volume information 225 in the entry of the pair management table 220 that corresponds to the recovery volume. Accordingly, when the write data is written in the active volume of the HA pair thereafter, the write data is appropriately stored in the recovery volume.

Next, the recovery volume creating program 780 restarts the IO process for the volume that has stopped the IO process from the host 400 (step S787). Accordingly, in this node 100, the host write IO process shown in FIG. 11 is executed.

Accordingly, in case a network failure occurs with the node 100 holding the volume constituting the HA pair, the write data to be written in the volume thereafter can be made appropriately redundant and stored.

Embodiment 2

Next, a second embodiment is described.

The second embodiment is different from the first embodiment in the following points. In the first embodiment, the journal log 600 is stored in the recovery volume, thereby allowing the write data and the storage destination of the write data in the volume to be identified. In the second embodiment, the write data is stored in the recovery volume, and the storage destination of the write data in the volume is managed using a bitmap that represents update information on each page in the volume. Here, the page may be, for example, an area corresponding to one logical block, or an area corresponding to multiple logical blocks.

Next, a data management process according to the second embodiment is described.

FIGS. 13A to 13E are diagrams illustrating the data management process according to the second embodiment.

Figure 13A:
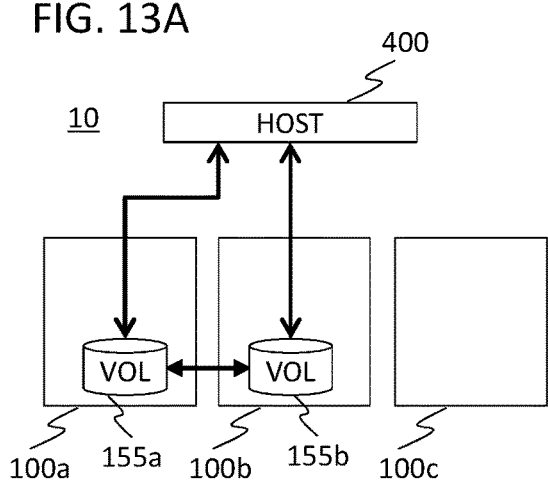
FIGS. 13A to 13E are diagrams illustrating a data management process according to a second embodiment.

Here, a computer system 10 is assumed to be in an initial state as shown in FIG. 13A. The state in FIG. 13A is the same as the state in FIG. 7A.

Figure 13B:
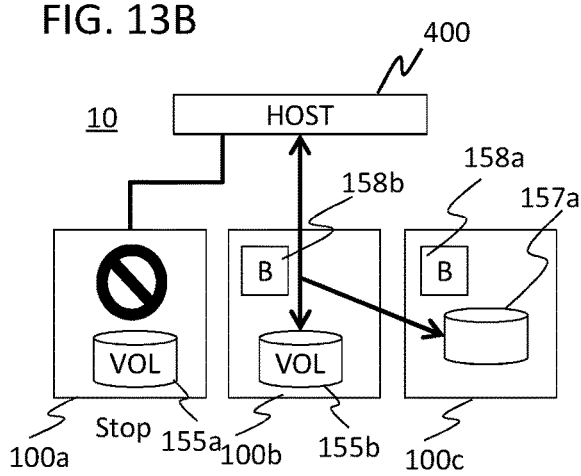

Here, when the node 100a (first node) is stopped, as shown in FIG. 13B, the scheduled stop program 700 of the management computer 410 creates a recovery volume 157a which is for recovering the volume 155a in a case of restart of the operation of the node 100a, in the node 100c (third node) other than the node 100a and the node 100b (second node), which store the respective volumes 155a and 155b constituting the HA pair, and creates a recovery pair using the volume 155b and a recovery volume 157a. The scheduled stop program 700 of the management computer 410 creates bitmaps 158a and 158b that represent the update state of the write data for each page in the volumes 155b and 157a, in the node 100b and the node 100c.

In this case, write data for the write request (host write IO) issued from the host 400 for the volume 155b of the node 100b is duplicated between the volume 155b and the recovery volume 157a. When the write data is stored, the node 100b configures the bit in the bitmap 158b that corresponds to the page in the volume 155b that stores the write data, as a value (e.g., "1") indicating that update has been made. Likewise, the node 100c configures the bit in the bitmap 158b that corresponds to the page in the recovery volume 157a that stores the write data, as a value (e.g., "1") indicating that update has been made.

Figure 13C:
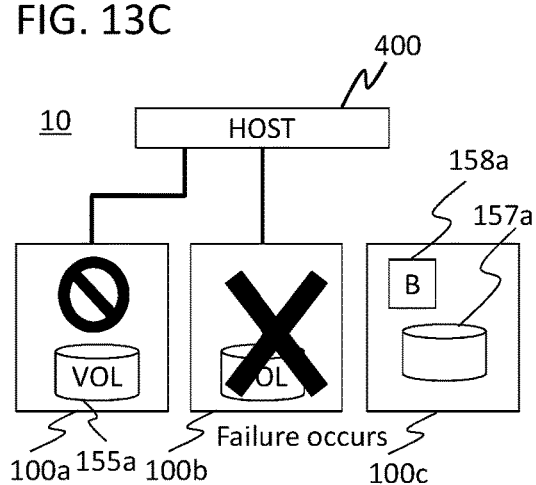

In the state shown in FIG. 13B, in case a failure occurs in the node 100b, the volume 155b in the node 100b cannot be accessed from the host 400, as shown in FIG. 13C.

Figure 13D:
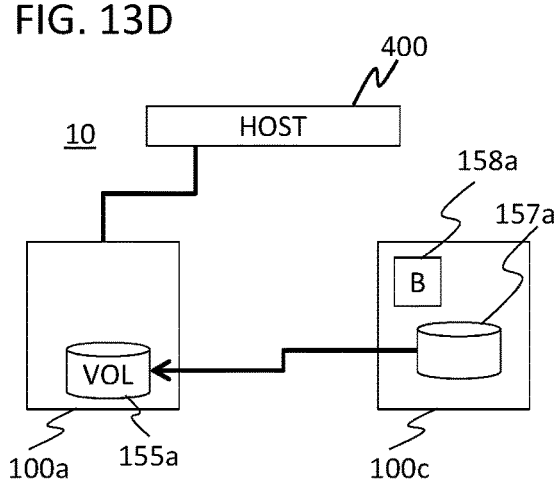

In case of the state shown in FIG. 13C, the stop of the node 100a is released, and subsequently, as shown in FIG. 13D, the data resynchronization program 720 of the management computer 410 causes the volume 155a to recover the state of holding the latest data, on the basis of the bitmap 158a in the node 100c and the recovery volume 157a. More specifically, the data resynchronization program 720 of the management computer 410 identifies the page in the recovery volume 157a that has a value indicating that the update has been made in the bitmap 158a in the node 100c, and stores the data on the identified page in the recovery volume 157a into the corresponding page in the volume 155a.

Figure 13E:
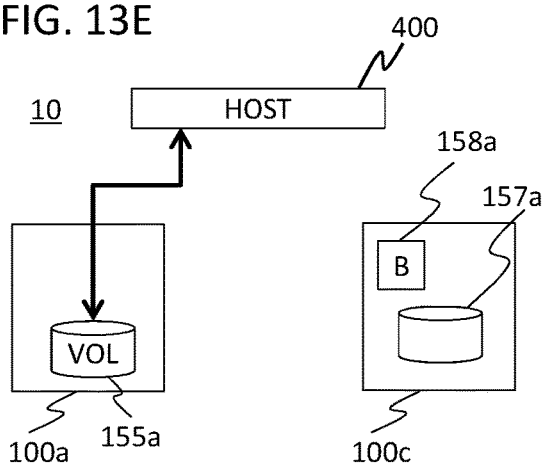

Subsequently, the data resynchronization program 720 of the management computer 410 restarts IO from the host 400 for the volume 155a of the node 100a, and then, as shown in FIG. 13E, the host 400 can perform the IO for the volume 155a that holds the latest data.

Embodiment 3

Next, a third embodiment is described.

The third embodiment is different from the first embodiment in the following points. In the first embodiment, the journal log 600 is stored in the recovery volume, thereby the write data and the storage destination of this write data in the volume to be identified. In the third embodiment, an update difference from a stationary point in the volume of the HA pair (at the time point when the node 100 becomes stationary) is stored in a snapshot volume. The snapshot volume allows an updated part and its data to be identified. The snapshot volume is created in a node different from the nodes where the volumes of the HA pair are stored.

Next, a data management process according to the third embodiment is described.

FIGS. 14A to 14F are diagrams illustrating the data management process according to the third embodiment.

Figure 14A:
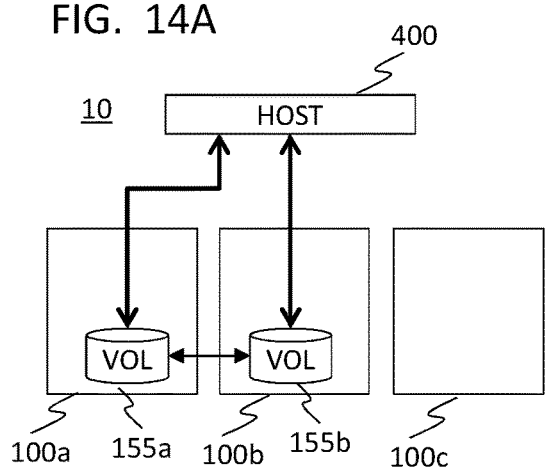
FIGS. 14A to 14F are diagrams illustrating a data management process according to a third embodiment.

Here, a computer system 10 is assumed to be in an initial state as shown in FIG. 14A. The state in FIG. 14A is the same as the state in FIG. 7A.

Figure 14B:
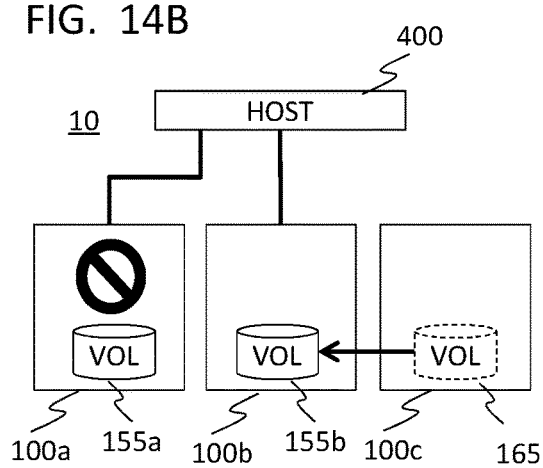

Here, when the node 100a (first node) is stopped, as shown in FIG. 14B, the scheduled stop program 700 of the management computer 410 creates a volume 165 corresponding to the volume 155b in the node 100c (third node) other than the node 100a and the node 100b (second node), which store the respective volumes 155a and 155b constituting the HA pair.

Figure 14C:
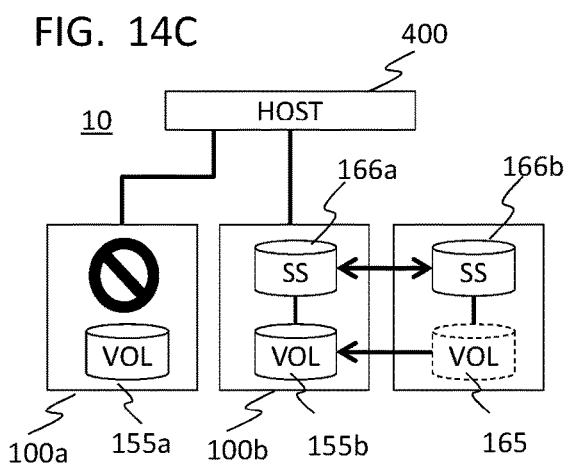

Next, as shown in FIG. 14C, the scheduled stop program 700 of the management computer 410 takes a snapshot of the volume 155b at the time point and creates a snapshot volume 166a in the node 100b that stores the volume 155b, takes a snapshot of the volume 165 at the time point and creates a snapshot volume 166b (third volume) in the node 100c that stores the volume 165, and configures the snapshot volume 166a and the snapshot volume 166b as a TC (True Copy) pair.

In this case, the node 100b stores write data for the write request (host write IO) issued from the host 400 for the volume 155b, in the snapshot volume 166a in a manner capable of identifying the storage position in the volume 155b. The node 100b copies the content written in the snapshot volume 166a to the snapshot volume 166b. Accordingly, the write data is stored in the snapshot volume 166b in the manner capable of identifying the storage destination of the volume 155b, thus duplicating the write data.

Figure 14D:
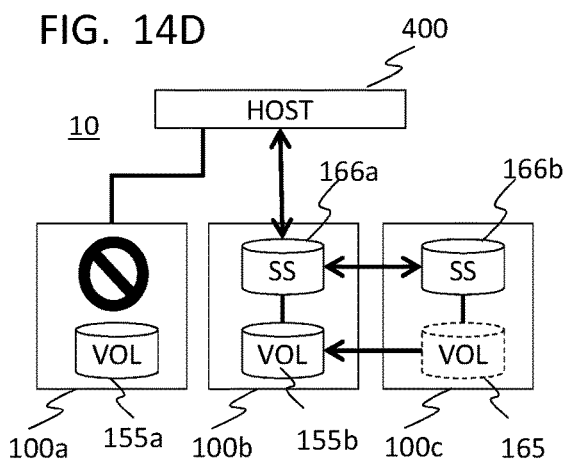
Figure 14E:
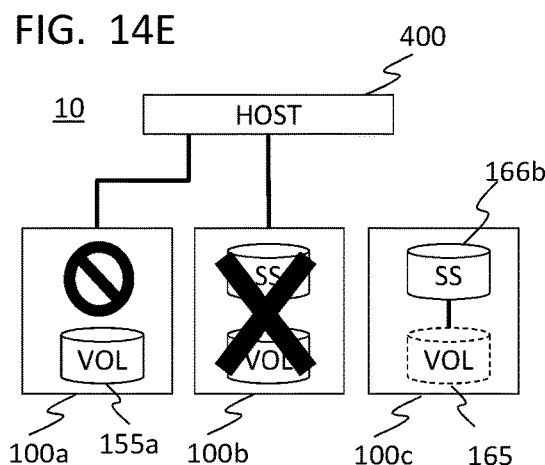

In the state shown in FIG. 14D, in case a failure occurs in the node 100b, the volume 155b in the node 100b cannot be accessed from the host 400, as shown in FIG. 14E.

Figure 14F:
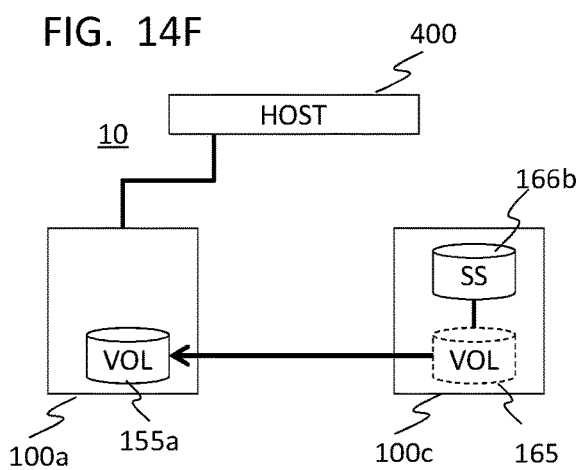

In case of the state shown in FIG. 14E, the stop of the node 100a is canceled, and subsequently, as shown in FIG. 14F, the data resynchronization program 720 of the management computer 410 causes the volume 155a to recover the state of holding the latest data, on the basis of the update difference of the snapshot volume 166b. More specifically, the data resynchronization program 720 of the management computer 410 stores the update data stored in the snapshot volume 166a at a corresponding position in the volume 155a.

As a result, the data resynchronization program 720 of the management computer 410 restarts IO from the host 400 for the volume 155a of the node 100a and then the host 400 can perform the IO for the volume 155a that holds the latest data.

The present invention is not limited to the embodiments described above, and can be implemented in an appropriately modified manner in a scope without departing the spirit of the present invention.

For example, in the embodiments described above, the node 100 executes the process in case of network failure occurrence shown in FIG. 12, thereby allowing the process to be executed soon in response to occurrence of a failure. The present invention is not limited thereto. The process in case of network failure occurrence shown in FIG. 12 may be executed by the management computer 410, for example.

In the third embodiment described above, the content of update of the write data for the active volume of the HA pair after the first node becomes offline is stored in the snapshot volume. The present invention is not limited thereto. For example, the CPU 120 of the node 100 may allow the snapshot volume to be used normally. That is, when an update occurs for the active volume of the HA pair, data in an update area that has not been updated yet may be stored in the snapshot volume. In this case, a volume (recovery volume) having a size corresponding to the volume in the second node may be preliminarily generated in the third node, the CPU 412 of the management computer 410 may store the write data after the first node becomes offline in the corresponding volume in the second node and in the recovery volume in the third node. According to such a configuration, the area updated after the offline state can be identified on the basis of the content of the snapshot volume, and the data in the identified area in the recovery volume is the data updated after the first node becomes offline. Consequently, the CPU 412 of the management computer 410 or the CPU 120 of the node 100 writes the updated data in the volume in the first node, thereby allowing the volume in the first node to recover the latest state.

In the aforementioned embodiments, examples where the node 100 and the management computer 410 are configured as different computers are shown. The present invention is not limited thereto. The node 100 and the management computer 410 may be integrally configured as a single computer.

In the aforementioned embodiments, certain parts or all the processes executed by the CPU 120 of the node 100 and the CPU 412 of the management computer 410 may be implemented as hardware circuits. Each of the programs executed by the node 100 and the management computer 410 in the embodiments described above may be installed from a program source. The program source may be a program distribution server or a storage medium (e.g., a portable storage medium).

What is claimed is:

1. A computer system, comprising:
   a plurality of nodes capable of storing data, and a management computer that manages the nodes,
   wherein a first volume of a first node and a second volume of a second node constitute an HA (High Availability) pair for managing identical data in a duplicated manner,
   wherein the first node becomes offline in a state that can be changed to be online,
   wherein a processor unit of the second node is configured to, when the first node becomes offline, write write data that is to be written into the second volume of the second node after the first node becomes offline into the second volume and into a third volume of a third node that is different from the first node and the second node,
   wherein upon a failure occurring in the second node, the first node becomes online, and
   wherein same data as the data written into the second node is recovered in the first node by using data that was previously written into the first node before the first node was offline and data that was written into the third node after the first node becomes offline.

2. The computer system according to claim 1,
   wherein the processor unit of the second node is configured to write the write data that is to be written into the second volume, as a journal log, into the third volume.

3. The computer system according to claim 1,
   wherein the processor unit of the second node is configured to manage a bitmap in the second node and the third node, the bitmap enabling to identify one or more areas in the second volume in which the write data is written after the first node becomes offline.

4. The computer system according to claim 1,
   wherein the processor unit of the second node is configured to generate a first snapshot volume that indicates a state of the second volume at a time point when the first node becomes offline, in the second node, create a second snapshot volume corresponding to the first snapshot volume, as the third volume, in the third node, and write the write data for the second volume, in the first snapshot volume and the second snapshot volume, in a manner capable of identifying a storage position in the second volume.

5. The computer system according to claim 1,
   wherein a processor unit of any of the plurality of nodes or the management computer is configured to control data writing so that the first volume of the first node and the second volume of the second node can be identical data, based on the write data written in the third volume of the third node, when the first node becomes online.

6. The computer system according to claim 1,
wherein a processor unit of any of the plurality of nodes or the management computer is configured to:
stop a state of the HA pair of the first volume of the first node and the second volume of the second node, when it is detected that the first node becomes offline, and
determine the third node that creates the third volume, and generate the third volume in the third node.

7. The computer system according to claim 1,
wherein any processor unit of the management computer is configured to:
accept designation of the first node that is an offline target, and identifies one or more first volumes constituting the HA pair among one or more volumes of the first node,
identify one or more second volumes that constitute the HA pair with the one or more first volumes,
determine the third node that is caused to generate the third volume,
cause the third node to generate the third volume, and
output a request for stopping the first node after generation of the third volume.

8. A data management method executed by a computer system comprising a plurality of nodes capable of storing data, and a management computer that manages the nodes,
wherein a first volume of a first node and a second volume of a second node constitute an HA (High Availability) pair for managing identical data in a duplicated manner, and
wherein the first node becomes offline in a state that can be changed to be online,
the method comprising:
when the first node becomes offline, writing write data that is to be written into the second volume of the second node after the first node becomes offline into the second volume and into a third volume of a third node that is different from the first node and the second node;
upon a failure occurring in the second node, causing the first node to become online; and
recovering in the first node same data as the data written into the second node by using data that was previously written into the first node before the first node was offline and data that was written into the third node after the first node becomes offline.

9. The data management method according to claim 8,
wherein when the first node becomes online, data is written so that the first volume of the first node and the second volume of the second node can be identical data, based on the write data written in the third volume of the third node.

10. A non-transitory computer readable medium storing a data management program to be executed by a computer for managing data on volumes managed by a plurality of nodes,
the data management program causing the computer to execute, in a case where a first volume of a first node and a second volume of a second node constitute an HA (High Availability) pair for managing identical data in a duplicated manner,
wherein the first node becomes offline in a state that can be changed to be online,
wherein when the first node becomes offline, writing write data that is to be written into the second volume of the second node after the first node becomes offline into the second volume and into a third volume of a third node that is different from the first node and the second node,
wherein upon a failure occurring in the second node, the first node becomes online, and
wherein same data as the data written into the second node is recovered in the first node by using data that was previously written into the first node before the first node was offline and data that was written into the third node after the first node becomes offline.

11. The non-transitory computer readable medium according to claim 10,
wherein the data management program further causing the computer to execute, when the first node becomes online, writing data so that the first volume of the first node and the second volume of the second node can be identical data, based on the write data written in the third volume of the third node.

* * * * *